(12) United States Patent
Lahetkangas et al.

(10) Patent No.: US 10,609,707 B2
(45) Date of Patent: Mar. 31, 2020

(54) COMMUNICATION OF CONTROL INFORMATION AND DATA IN FRAMES

(71) Applicant: Nokia Solutions and Networks Oy, Espoo (FI)

(72) Inventors: Eeva Lahetkangas, Oulu (FI); Kari Pekka Pajukoski, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/436,246

(22) PCT Filed: Oct. 18, 2012

(86) PCT No.: PCT/EP2012/070644
§ 371 (c)(1),
(2) Date: Apr. 16, 2015

(87) PCT Pub. No.: WO2014/060037
PCT Pub. Date: Apr. 24, 2014

(65) Prior Publication Data
US 2015/0282167 A1 Oct. 1, 2015

(51) Int. Cl.
*H04W 72/04* (2009.01)
*H04L 5/00* (2006.01)
*H04L 27/26* (2006.01)

(52) U.S. Cl.
CPC ....... *H04W 72/0446* (2013.01); *H04L 5/0044* (2013.01); *H04L 5/0091* (2013.01); *H04L 27/26* (2013.01)

(58) Field of Classification Search
CPC ......... H04W 52/0225; H04W 52/0229; H04W 52/0274; H04W 72/042; H04B 7/0686–0693; H04B 7/0868–0877
See application file for complete search history.

(56) References Cited

U.S. PATENT DOCUMENTS

| | | | |
|---|---|---|---|
| 2009/0225707 A1* | 9/2009 | Baldemair | H04J 13/0003 370/329 |
| 2010/0118789 A1* | 5/2010 | Shimomura | H04W 28/06 370/328 |

(Continued)

FOREIGN PATENT DOCUMENTS

| | | |
|---|---|---|
| EP | 2 219 336 A1 | 8/2010 |
| WO | WO 2013/149651 A1 | 10/2013 |

OTHER PUBLICATIONS

Nokia: "SC-FDMA uplink frame structure for simulations"; R1-050640; 3GPP TSG RAN WG1#41bis, Sophia Antipolis, France; Jun. 20-21, 2005; pp. 1-10; 3rd Generation Partnership Project (3GPP); Mobile Competence Centre; 650, Route des Lucioles; F-06921 Sophia-Antipolis Cedex; France.

(Continued)

Primary Examiner — Pao Sinkantarakorn
(74) Attorney, Agent, or Firm — Harrington & Smith (57) ABSTRACT

A frame or a subframe including control information and data is transmitted using orthogonal frequency division multiple access (OFDMA). At least one different OFDMA parameter and/or format is applied to said control information than to said data. At a receiver the frame or subframe is processed by taking into account the application of the at least one different OFDMA parameter and/or format.

17 Claims, 4 Drawing Sheets

(56) References Cited

U.S. PATENT DOCUMENTS

| | | | | |
|---|---|---|---|---|
| 2010/0118814 A1* | 5/2010 | Ohseki | ............... | H04L 5/0039 |
| | | | | 370/329 |
| 2010/0149961 A1* | 6/2010 | Lee | ............... | H04L 5/0007 |
| | | | | 370/204 |
| 2011/0080963 A1* | 4/2011 | Kim | ............... | H04W 72/04 |
| | | | | 375/260 |
| 2011/0216845 A1* | 9/2011 | Nakao | ............... | H04B 7/0682 |
| | | | | 375/295 |
| 2013/0301508 A1* | 11/2013 | Almog | ............... | H04W 52/028 |
| | | | | 370/311 |

OTHER PUBLICATIONS

Bertrand Muquet et al: "Cyclic Prefixing or Zero Padding for Wireless Multicarrier Transmissions?"; IEEE Transactions on Communications vol. 50, No. 12, Dec. 2002; pp. 2136-2148; IEEE; 3 Park Avenue; New York; NY 10016-5997; USA.

Preben Mogensen et al: "B4G local area: high level requirements and system design" GC' 12 Workshop: International Workshop on Emerging Technologies for LTE-Advance and Beyond-4G; pp. 613-617; ISBN: 978-1-4673-4941-3; IEEE; 3 Park Avenue; New York; NY 10016-5997; USA.

Mason, Sean, et al., "Detection, Synchronization, and Doppler Scale Estimation with Multicarrier Waveforms in Underwater Acoustic Communication", Oceans 2008—MTS/IEEE Kobe Techno-Ocean, IEEE, Piscataway, New Jersey, Apr. 8, 2008, 6 pgs.

Wu, Kaishun, et al., "hJam: Attachment Transmission in WLANs", Infocom, 2012 Proceedings IEEE, Mar. 25, 2012, 9 pgs.

\* cited by examiner

COMMUNICATION OF CONTROL INFORMATION AND DATA IN FRAMES

This disclosure relates to communication of frames carrying control information and data between communicating devices.

Communication of control information and data in frames can be provided between two or more devices such as fixed or mobile communication devices, base stations, servers, machine type devices, and/or other communication nodes. A communication system and compatible communicating devices typically operate in accordance with a given standard and/or specification setting out how various entities of the system shall operate. Communications may take be provided on fixed or wireless connections. In a wireless system at least a part of the communication between at least two devices, or stations occurs over a wireless interface. Examples of wireless systems include public land mobile networks (PLMN) such as cellular networks, satellite based communication systems and different wireless local networks, for example wireless local area networks (WLAN) and/or WiMax (Worldwide Interoperability for Microwave Access). A more particular example of wireless communication systems is an architecture standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced.

In a wireless system a communication device can provide a transceiver station that can communicate with another communication device such as e.g. base stations of access networks and/or other user equipment. A communication device of a user is often referred to as user equipment (UE) or terminal. A communication device is provided with an appropriate signal receiving and transmitting arrangement for enabling communication of data and signalling with other parties. For example, access to a communication network or communications directly with other users can be provided. The communication device may access a wider communication system via a base station, for example a base station providing at least one cell. Communication link in the direction from the mobile device or station to the base station and from the base station to the mobile device or station are often referred to as the uplink (UL) and the downlink (DL), respectively.

A tight latency requirement, for example a requirement in the order of about 1 ms can cause tight targets for round trip time (RRT) between communicating stations. This can cause faster uplink/downlink (UL/DL) switching time requirements. In order to achieve faster UL/DL switching and flexible UL/DL switching ratio, modifications to physical frame structure, for example current LTE-Advanced time division duplexing (TDD) radio, may be needed.

Orthogonal frequency division multiplexing (OFDM) is a possible modulation scheme for wireless communications. OFDM is a technique where a number of evenly spaced subcarriers are modulated instead of a single carrier being modulated. OFDM enables simple one-tap equalization at the receiver side, due to its straightforward extension to multiple input multiple output (MIMO) transmissions and because of its good latency and cost effectiveness properties. In OFDM systems, OFDM subcarrier (SC) spacing should be as small as possible to minimize the relative cyclic prefix overhead in the system. On the other hand, too small SC spacing can increase the sensitivity of the OFDM transmission to Doppler spread and different kinds of frequency inaccuracies.

Orthogonal frequency division multiple access (OFDMA) provides a multi-user OFDM that allows multiple access on the same channel comprising a group of evenly spaced subcarriers. OFDMA distributes subcarriers among users so that they can transmit and receive at the same time within a single channel. Different types or formats of OFDMA can be provided. For example, cyclic prefix OFDMA (CP-OFDMA) and zero padding OFDMA (ZP-OFDMA) are possible. In CP-OFDMA, a cyclic prefix (CP) is added at the transmitter before symbols. The cyclic prefix is then discarded at the receiver end to avoid interblock interference. In ZP-OFDMA a zero signal is transmitted between OFDMA symbols instead of a cyclic prefix.

In a scheduled system a user equipment (UE) initiated access to a base station, for example an evolved Node B (eNodeB) typically needs three TDD cycles: Scheduling request from a UE to a eNodeB in UL, scheduling grant (e.g. resource assignment) from the eNodeB to the UE in DL and finally data transmission from the UE to the eNode B in UL.

In OFDMA the minimum transmission period is one OFDMA symbol. Thus the minimum resource allocation for the scheduling request and grant signal message is one OFDMA symbol. The tight latency requirement can result in a significant overhead, as can be seen from FIG. 7 where the scheduling signalling overhead of two control symbols (for TX & RX) is shown by plot denoted by reference 70 as a function of scheduling period for OFDMA symbol length of 67 μs. In the example subcarrier spacing is 15 kHz with CP and guard period (GP) values are 0.5 μs, two GPs per frame. An increase in the minimum amount of control overhead can be seen when the scheduling period decreases. This may become an issue in systems where control overhead with tight latency requirement needs to be minimized in order to provide sufficient data rates.

Embodiments of the invention aim to address one or several of the above issues.

It is noted that the issues are not limited to any particular communication system, standard, specification, radios and so forth, but may occur in any communication device and/or system where a device can be provided with coexisting radios.

In accordance with an embodiment there is provided a method for a wireless transmitter, comprising causing transmission of a frame or a subframe comprising control information and data using orthogonal frequency division multiple access (OFDMA), wherein at least one different OFDMA parameter and/or format is applied to said control information than to said data.

In accordance with an embodiment there is provided a method for a wireless receiver, comprising processing a frame or subframe comprising control information and data and received based on orthogonal frequency division multiple access (OFDMA), wherein at least one different OFDMA parameter and/or format is applied to said control information than to said data.

In accordance with an embodiment there is provided an apparatus for a transmitter, the apparatus comprising at least one processor, and at least one memory including computer program code, wherein the at least one memory and the computer program code are configured, with the at least one processor, to cause transmission of a frame or subframe comprising control information and data using a orthogonal frequency division multiple access (OFDMA), wherein at least one different OFDMA parameter and/or format is applied to said control information than to said data.

In accordance with an embodiment there is provided an apparatus for a receiver, the apparatus comprising at least one processor, and at least one memory including computer program code, wherein the at least one memory and the computer program code are configured, with the at least one processor, to process a frame comprising control information and data and received based on orthogonal frequency division multiple access (OFDMA), wherein at least one different OFDMA parameter and/or format is applied to said control information than to said data.

In accordance with a yet further embodiment there is provided a frame or subframe for wireless communication of control information and data, the frame or subframe being arranged in accordance with orthogonal frequency division multiple access (OFDMA) and such that at least one different OFDMA parameter and/or format is applicable to said control information than to said data.

In accordance with a more detailed aspect transmission of control information and data can be separately switched between on and off states. Similarly, reception of control information and data can be separately switched between on and off states.

The control information and data may be split into non-overlapping portions based time or frequency. The control information and data can be arranged in distinct portions of the frame or subframe such that the control information and data can be received by separate receivers.

Different symbol time is provided for control information and data by differently defined subcarrier spacing.

Different criteria may be used for defining the at least one OFDMA parameter for the control information and the data.

At least one of orthogonal frequency division multiplexing (OFDM) numerology, OFDM variants, processing time requirements and link adaptation may be applied differently to control information than data.

Zero padding OFDMA may be used for the control information and cyclic prefix OFDMA may be used for the data.

A combined guard period (GP) and zero padding may be used for the control information.

A node such as a base station or a user equipment implementing the embodiments may also be provided.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 to 3 to assist in understanding the technology underlying the described examples.

Figure 1:
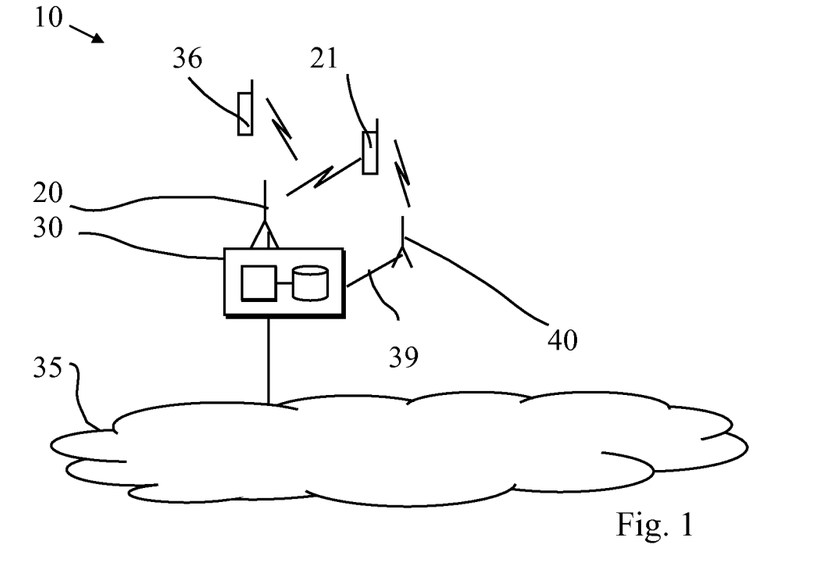
FIG. 1 shows an example of a communication system wherein below described examples of the invention may be implemented.

In a mobile system a mobile communication device is can be provided wireless access via at least one access node such as a base station, a remote radio head or another wireless transceiver node. In FIG. 1 base station 20 and a remote radio head 40 are shown to provide wireless access for devices 21 and 36. It is noted that the number of devices can be greater than two. Nodes 20 and 40 are connected for signalling purposes, as indicated by the connection 39. The communications can be provided based on a Multiple Input/Multiple Output (MIMO) antenna arrangement. It is noted that such an arrangement can be provided in various manners, and that FIG. 1 is only an example of a multi-antenna system.

A transceiver node such as a base station or a mobile station is typically controlled by at least one appropriate controller so as to enable operation thereof and management of mobile communication devices in communication with the station. The control apparatus can be interconnected with other control entities. In FIG. 1 a control apparatus of base station 20 is shown schematically as being provided by block 30. The control apparatus and functions may be distributed between a plurality of control units. In FIG. 1 example controller 30 is connected to a wider communications network 35.

Figures 2, 3:
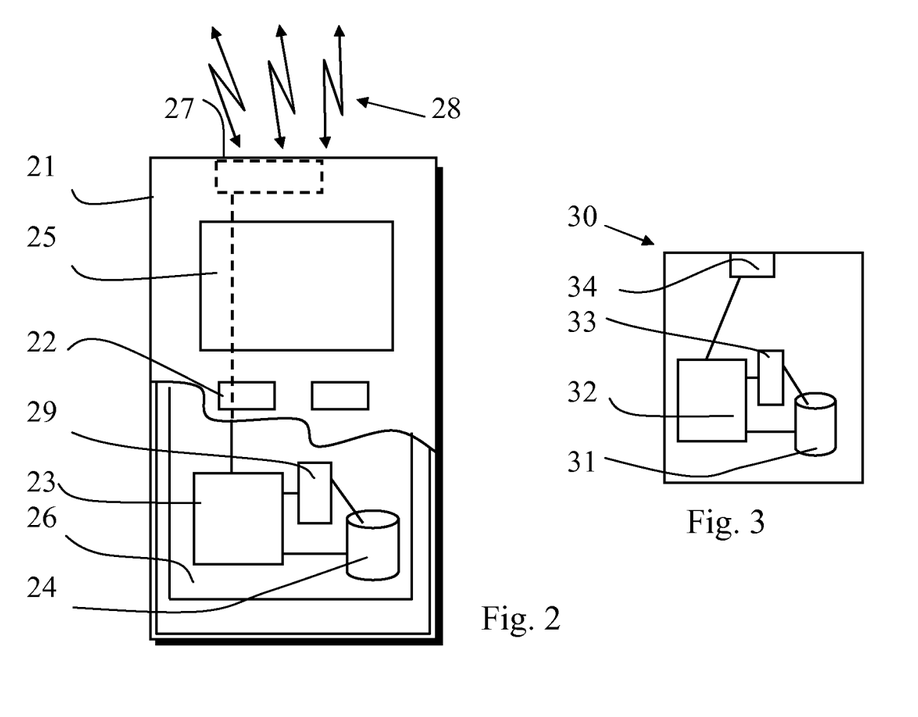
FIG. 2 shows an example of a communication device.
FIG. 3 shows an example of control apparatus for a base station.

FIG. 2 shows a schematic, partially sectioned view of a mobile communication device 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A wireless communication device is typically provided with at least one data processing entity 23, at least one memory 24 and other possible components 29 for use in software and hardware aided execution of tasks it is designed to perform, including control of communications of information in radio frames with other stations. The data processing, storage and other relevant control apparatus can be provided on an appropriate circuit board and/or in chipsets. This feature is denoted by reference 26. Data processing and memory functions provided by the control apparatus of the mobile device to cause control and signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device 21 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. The transceiver apparatus 27 of the device may be configured to provide a Multiple Input/Multiple Output (MIMO) antenna system.

FIG. 3 shows an example of a control apparatus 30, for example to be coupled to and/or for controlling a station of a radio service area, for example the station 20 of FIG. 1. The control apparatus 30 can be arranged to process and/or control signalling and other communications by mobile communication devices in a service area of a station. The control apparatus can control operation of mobile devices within its service area based on information communicated in accordance with certain embodiments described below, for example for controlling use of ODFMA frames or subframes and insertion and/or obtaining of control information and data to and from frames or subframes communicated between the stations.

To provide the herein described functions the control apparatus 30 can comprise at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

In this specification terms frame and subframe can be used interchangeably and are understood to refer to a frame or a subframe for carrying information, as appropriate in the context, and thus in the following reference is only made to frame.

A frame can be used to carry at least two types of information, typically at least control information and data. Control information in commonly understood to refer to information communicated on the control plane and required for signalling purposes to control the operation of at least one of the nodes involved in the communications. Data, or data plane (or user plane) information, is commonly understood refer to the user data, or content, communicated between the parties. The planes can be for example Layer 1/Layer 2 (L1/L2) control and data planes.

Control plane and data plane can be arranged within a frame such that both short round trip time (RTT) via short frame length and minimized control signalling overhead with minimum related processing time is enabled. The inventors have recognised that this can be achieved by a specific control and data signalling arrangement in which control and data planes of a frame are split into distinct, non-overlapping portions where at least one different multiplexing parameter is applied to control information and data.

Figure 4:
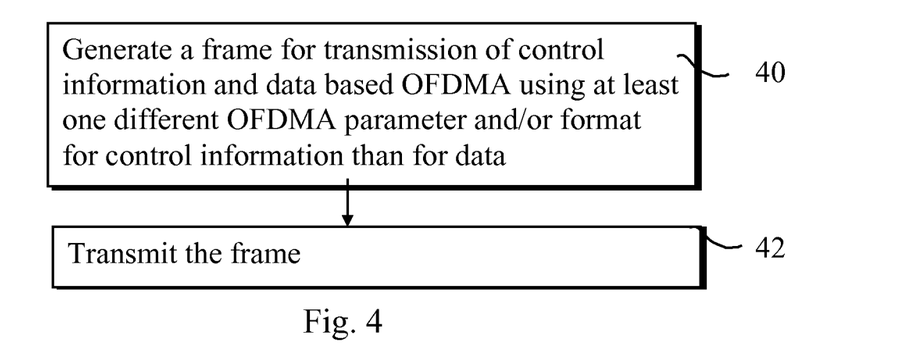
FIGS. 4 and 5 show flowcharts illustrating certain embodiments.

FIG. 4 is a flowchart in accordance with an embodiment showing operation at a wireless transmitter apparatus adapted to use frames provided in accordance with OFDMA where control information and data are placed in different portions of the frame. At step 40 a frame (or subframe) is generated containing control information and data in the respective portions based on a orthogonal frequency division multiple access (OFDMA). At least one different OFDMA parameter and/or format is applied to said control information than to said data. At 42 the frame is transmitted for reception by at least one receiver apparatus.

Figure 5:
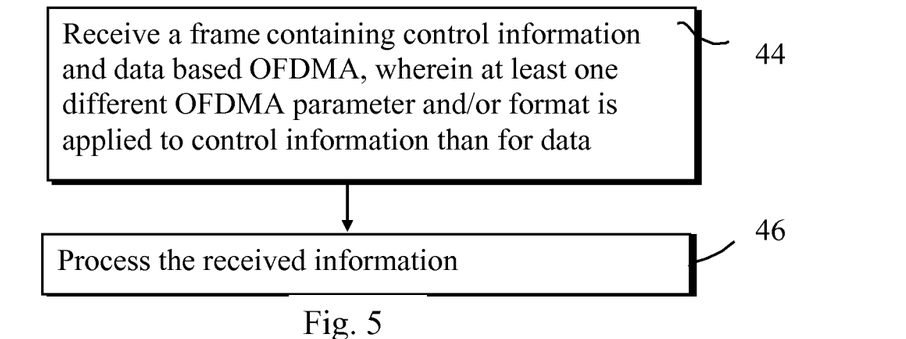

FIG. 5 shows operation at a network entity receiving the frame at 44. The received frame comprising the control information and data and transmitted based on orthogonal frequency division multiple access (OFDMA) is processed at 46 to obtain the control information and the data from the frame where at least one different OFDMA parameter and/or format is applied to said control information than to said data.

In accordance with a further embodiment the frame is arranged such that control information and data can be received by separate receivers. The distinct portions may be arranged to have differently defined subcarrier spacing.

In accordance with an embodiment switching between on and off states can be caused to take place separately for transmission of control information and transmission of data and/or for reception of control information and reception of the data.

Splitting to distinct portions such that different portions can be received using separate receivers can be provided e.g. in time or frequency. For example, the different part can be separated by means of time division multiplexing (TDM).

Different optimization criteria can be used in designing portions in a frame for control and data planes. For example, the design of the control plane can aim for at least one of a low complexity, ultra-fast detection, maximal usage of hardware accelerators, maximized power-off time and scalable overhead. The data plane may then be designed to provide at least one of optimization of cyclic prefix (CP) overhead, support for high signal to noise ratio (SNR), support for advanced receivers, and minimal need for data buffering.

Different approaches may be selected for control and data plane portions to achieve the different aims. These approaches may include different OFDM numerology including different subcarrier spacing, resulting different physical layer (PHY) overheads. Different OFDM variants may be used. Different processing time requirements may be set for control and data parts. The processing time requirements for both parts may be given by a relevant specification and/or standard. Different link adaptation approaches may also be used. For example, a control part may use fixed/limited modulation and coding scheme whereas a data part may utilize adaptive modulation and coding (AMC) scheme.

Currently relatively low subcarrier spacing frequencies are used is certain standards. For example, in LTE-A 15 kHz and in WiMAX 10.94 kHz are in use. The digital signal processing performance can be expected to increase, the expectation being an increase in the excess of ten times in execution time of fast Fourier transform (FFT) compared to the current component benchmarking values. Thus use of smaller subcarrier spacing frequencies with even larger bandwidths can be enabled even in the anticipated future bandwidths. This in part enables use of different subcarrier spacing for control and data fields. Different spacing can be used to provide different symbol times for control and data fields. The different spacing can be used to provide an optimal compromise between RTT and control overhead. This allows for different processing time requirements for the control and data fields.

Figure 6:
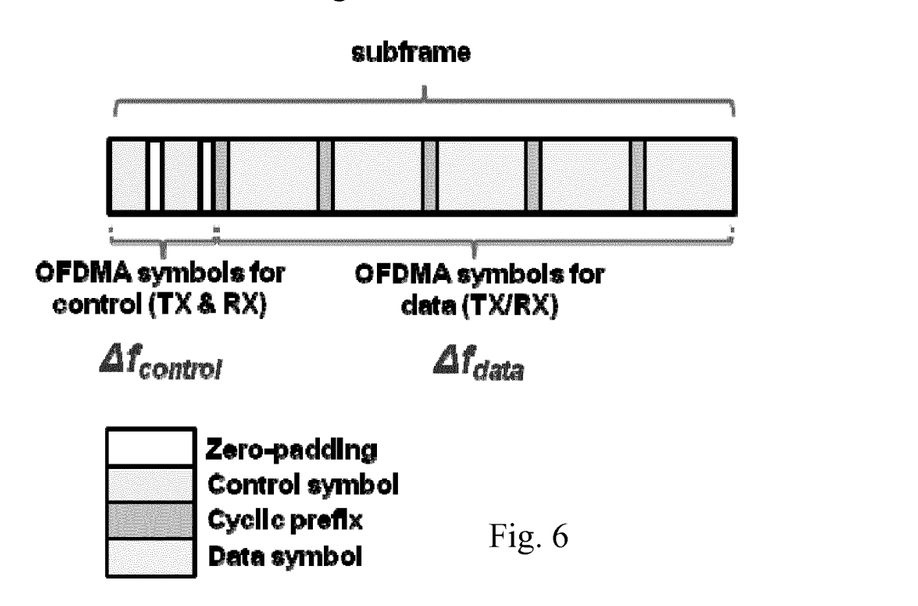
FIG. 6 shows a subframe structure with different subcarrier spacing frequencies for control and data plane portions.

The control and data portions can be time-separated, as illustrated in FIG. 6. In here different subcarrier spacing are used for control and data parts leading to different OFDM symbol lengths in these parts. In accordance with an embodiment subcarrier spacing of a control field is larger than is the spacing for the data field in order to shorten the control symbol lengths and to optimize the minimum amount of control overhead. In accordance with a possibility the minimum amount of control overhead is configurable.

Different processing time requirements for the control and data symbols may be set, according to an embodiment, such that the processing time requirement for control part containing shorter OFDM symbols are stricter than is the processing time requirement for data part.

Control and data planes may be split for reception by separate receivers. Control signalling resource field with a fixed size and without adaptive modulation and coding (AMC) may be used in order to simplify detection and interference coordination/cancellation in adjacent cells. Furthermore, only common search space may be applied for the resource assignments in order to support interference cancelling receivers. As a result, simpler and faster receivers may be used for the control part, thus in part enabling shorter control signalling processing times.

The processing time can also be minimized by placing data-associated control signalling before the data and thus enabling fast and cost efficient pipeline processing in the receiver. Control plane resources may be placed at the beginning of each subframe and the resources can be time-separated from data resources, as shown in FIG. 6. Control plane fields can include scheduling opportunities corresponding to scheduling requests and scheduling grants regarding the following data resources. Data resources can be either TX or RX resources.

FIG. 6 also illustrates the possibility of using different subcarrier spacing frequencies for control and data parts, $\Delta f_{control}$ for control field and $\Delta f_{data}$ for data field, resulting different OFDM symbol lengths in these parts. The subcarrier spacing of control field can be larger than is the spacing for the data field in order to shorten the control symbol lengths. Consequently, this leads to optimal compromise between subframe length (and consequently RTT) and control overhead.

One specific application of this embodiment is use of zero padding OFDMA (ZP-OFDMA) in the control part and cyclic prefix OFDMA (CP-OFDMA) in the data part. A benefit of using ZP-OFDMA in control part is that during a zero padding field no excess power is consumed as nothing is sent. Thus ZP is typically more power efficient compared to CP. ZP-OFDMA has also lower peak to average ratio (PAR). This can be especially the case in relations to very short control fields, e.g. where there is one symbol for TX and one symbol for RX. Also, guard period (GP) and zero padding fields can be combined. In accordance with an embodiment the combined GP and CP/ZP field length is about 0.5 μs. This can be used to lessen GP overhead.

The SNR operation point regarding the control part can be relatively low for fixed AMC, for example about 5 dB. This can provide the benefits of CP-OFDMA compared to ZP-OFDMA at higher S(I)NR levels.

Figure 7:
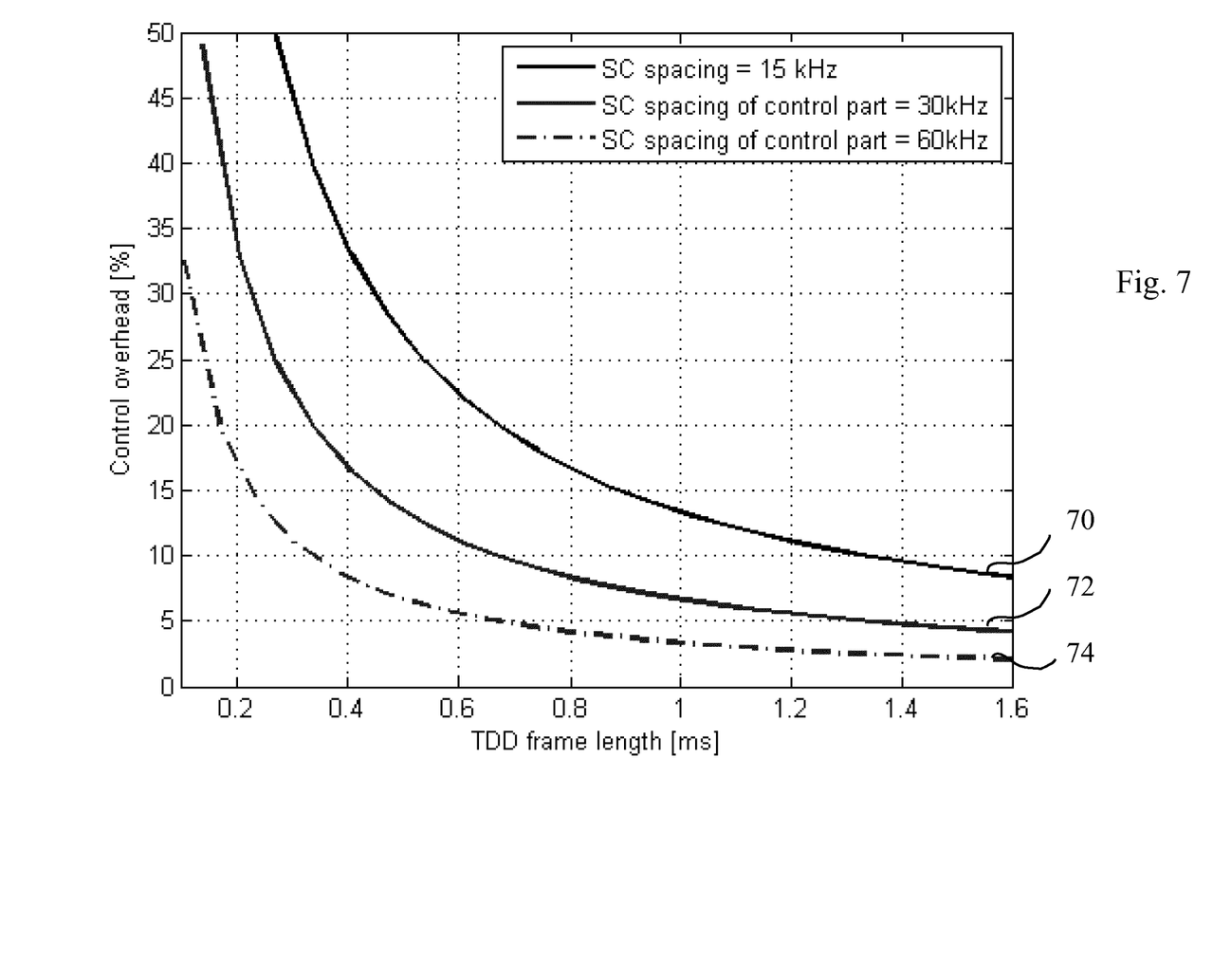
FIG. 7 shows simulation results.

FIG. 7 illustrates results of simulations on the effect of separate subcarrier spacing frequency for the control part in a situation where there are two control symbols in a frame. In the figure, curves denoted by references 72 and 74 illustrate the scenarios with 15 kHz subcarrier spacing for data part and 30 kHz or 60 kHz subcarrier spacing for control part, respectively.

The processing time requirements for control part containing shorter OFDM symbols can be made stricter than for data part. The larger subcarrier spacing of the control plane leads to a smaller FFT size and thus smaller FFT/IFFT processing times.

Figure 8:
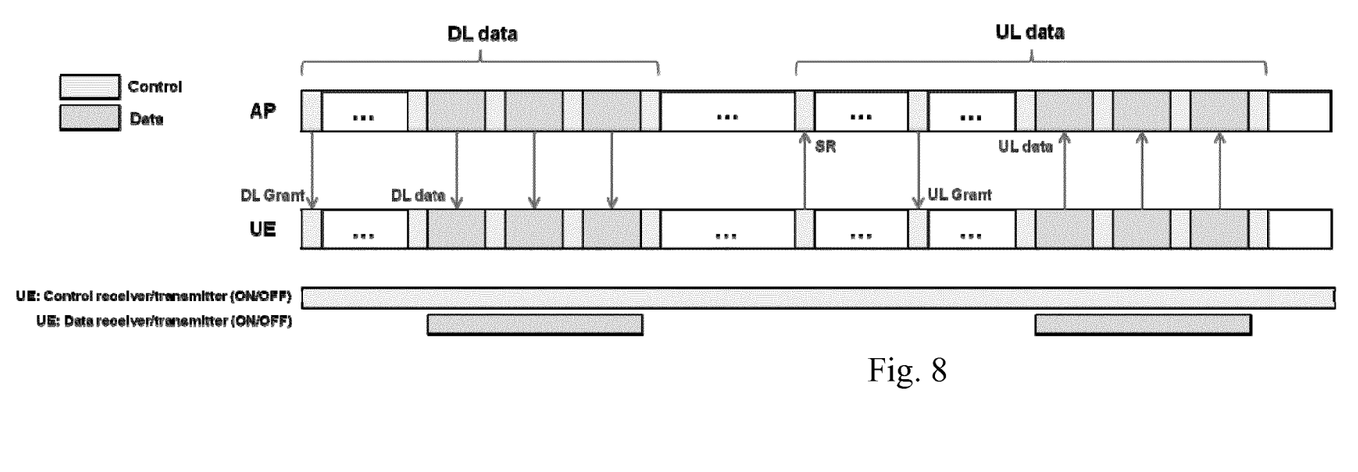
FIG. 8 shows an example of separation of control and data plane portions in accordance with an embodiment.

Further example of splitting control and data planes of the (sub)frame into non-overlapping portions so that they can be received using separate receivers is illustrated in FIG. 8. This embodiment provides possibility to switch the transmission/reception of control and data planes at the transmitter (Tx) and/or receiver (Rx) corresponding to control and data planes separately between ON and OFF states. In the example of FIG. 8, it is possible to switch the data transmitter/receiver of a user equipment (UE) to ON state only when data is actually transmitted between the UE and an access point (AP). At the same time the simpler control receiver/transmitter may be kept constantly in ON state.

The herein described examples aim to provide various advantages. Short scheduling latency and round trip time (RTT) may be achieved. Low energy consumption and/or low complexity with a minimum control signalling overhead may be provided. The subframe structure may support an optimal compromise between subframe length (and consequently RTT) and minimum amount of control overhead due to subcarrier spacing. The possibility to split control and data planes to separate receivers and the possibility to use of simple and fast receivers for control part, this enabling short control signalling processing times. The possibility to use ZP-OFDMA instead of CP-OFMDA in control part can be used to enable reduced GP overhead, decreased peak to average ratio (PAR) and better power efficiency. Shorter FFT/IFFT processing times of shorter control symbols may also be provided. Possibility to switch the transmission/reception of control and data planes at the transmitter/receiver separately between ON and OFF states can be used in obtaining lower power consumption.

The embodiments may be applied for example to Beyond 4G (B4G) radio system or an evolution of LTE. Although the above mentions time division duplex (TDD) in local area optimized radio system, aspects of the invention are applicable also to e.g. a frequency division duplex (FDD) based systems.

The various embodiment above can be provided as alternatives or as complementary solutions.

The required data processing apparatus and functions of a base station apparatus, a communication device and any other appropriate station or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described using terminology of communications system such as those based on the LTE and 3GPP standards, similar principles can be applied to other communication systems. For example, similar principles are applicable to systems where no fixed station equipment is provided but a communication system is provided e.g. by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method, comprising:
   causing, by a wireless transmitter, transmission of a frame or a subframe comprising control information and data using orthogonal frequency division multiple access,
   wherein said control information comprises information communicated on a control plane used for controlling operation of at least one node involved in wireless communications,
   wherein said data comprises information on a data or a user plane comprising user data or content communicated between the at least one node and another node,
   wherein at least one of a different orthogonal frequency division multiple access parameter or format is applied to said control information than to said data;
   splitting the control information and data into distinct non-overlapping portions based on time or frequency,
   wherein control information and data are split into the distinct non-overlapping portions of the frame or subframe such that the control information and data can be received by separate receivers; and
   configuring different subcarrier spacing frequency for the control information and data, comprising configuring spacing of a control field for the control information to be larger than spacing for a data field for said data shortening the control information length minimizing an amount of control overhead,
   wherein different symbol time is provided for control information and data by the different subcarrier spacing, and
   wherein zero padding orthogonal frequency division multiple access is used for the control information and cyclic prefix orthogonal frequency division multiple access is used for the data.

2. The method of claim 1, further comprising:
   separately switching the transmission of the control information and the data between on and off states.

3. The method of claim 1, wherein different criteria has been used for defining the at least one orthogonal frequency division multiple access parameter for the control information and the data.

4. The method of claim 3, wherein the portion of the frame for carrying the control information is defined to provide at least one of low complexity, fast detection, maximal usage of hardware accelerators, maximized power-off time and scalable overhead or the portion of the frame for carrying data is defined to provide at least one of optimization of cyclic prefix overhead, support for high signal to noise ratio, support for advanced receivers, and minimize the need for data buffering.

5. The method of claim 1, comprising applying differently to the control information and data at least one of orthogonal frequency division multiplexing numerology, orthogonal frequency division multiple access variants, processing time requirements and link adaptation.

6. The method of claim 1, comprising applying stricter processing time requirements to the control information than to the data.

7. The method of claim 1, wherein fixed modulation and coding is applied to the control information and adaptive modulation and coding is applied to the data.

8. The method of claim 1, comprising use of a combined guard period and said zero padding for the control information.

9. The method of claim 1, wherein common search space is applied for resource assignments.

10. A computer program product embodied on a non-transitory computer-readable medium in which a computer program is stored that, when being executed by a computer, is configured to provide instructions to control or to perform the steps of claim 1.

11. A method, comprising:
   processing, by a wireless receiver, a frame or subframe comprising control information and data and received based on orthogonal frequency division multiple access,
   wherein control information comprises information communicated on a control plane used for controlling operation of at least one node involved in wireless communications,
   wherein data comprises information on a data or a user plane comprising user data or content communicated between the at least one node and another node,
   wherein at least one of a different orthogonal frequency division multiple access parameter or format is applied to said control information than to said data;
   splitting the control information and data into distinct non-overlapping portions based on time or frequency,
   wherein the control information and data are split into the distinct non-overlapping portions of the frame or subframe such that the control information and data can be received by separate receivers; and configuring different subcarrier spacing frequency for the control information and data, comprising configuring spacing of a control field for the control information to be larger than spacing for a data field for said data shortening the control information length minimizing an amount of control overhead, wherein different symbol time is provided for control information and data by the different subcarrier spacing, and wherein zero padding orthogonal frequency division multiple access is used for the control information and cyclic prefix orthogonal frequency division multiple access is used for the data.

12. The method of claim 11, further comprising:
separately switching the reception of the control information and the data between on and off states.

13. An apparatus, the apparatus comprising:
at least one processor, and at least one memory including computer program code, wherein the at least one memory and the computer program code are configured, with the at least one processor to cause:
transmission, by a transmitter, of a frame or subframe comprising control information and data using a orthogonal frequency division multiple access,
wherein control information comprises information communicated on a control plane used for controlling operation of at least one node involved in wireless communications,
wherein data comprises information on a data or a user plane comprising user data or content communicated between the at least one node and another node,
wherein at least one of a different orthogonal frequency division multiple access parameter or format is applied to said control information than to said data;
splitting the control information and data into non-overlapping portions based time or frequency,
wherein control information and data are split into distinct non-overlapping portions of the frame or subframe such that the control information and data can be received by separate receivers; and
configuring different subcarrier spacing frequency for the control information and data, comprising configuring spacing of a control field for the control information to be larger than spacing for a data field for said data shortening the control information length minimizing an amount of control overhead,
wherein different symbol time is provided for control information and data by the different subcarrier spacing, and
wherein zero padding orthogonal frequency division multiple access is used for the control information and cyclic prefix orthogonal frequency division multiple access is used for the data.

14. The apparatus of claim 13, configured to separately switch a radio for the control information and the data between on and off states.

15. The apparatus of claim 13, wherein the at least one memory and the computer program code are further configured, with the at least one processor to apply differently at least one of orthogonal frequency division multiplexing numerology, OFDM variants, processing time requirements and link adaptation to the control information and data.

16. A node for a communication system comprising an apparatus as claimed in claim 13.

17. An apparatus, the apparatus comprising:
at least one processor, and at least one memory including computer program code, wherein the at least one memory and the computer program code are configured, with the at least one processor, to cause the apparatus to:
process, by a receiver, a frame comprising control information and data and received based on orthogonal frequency division multiple access,
wherein control information comprises information communicated on a control plane used for controlling operation of at least one node involved in wireless communications,
wherein data comprises information on a data or a user plane comprising user data or content communicated between the at least one node and another node,
wherein at least one of a different orthogonal frequency division multiple access parameter or format is applied to said control information than to said data; and
split the control information and data into distinct non-overlapping portions based time or frequency,
wherein control information and data are split into the distinct non-overlapping portions of the frame or subframe such that the control information and data can be received by separate receivers; and
configure different subcarrier spacing frequency for the control information and data, comprising configuring spacing of a control field for the control information to be larger than spacing for a data field for said data shortening the control information length minimizing an amount of control overhead,
wherein different symbol time is provided for control information and data by the different subcarrier spacing, and
wherein zero padding orthogonal frequency division multiple access is used for the control information and cyclic prefix orthogonal frequency division multiple access is used for the data.

* * * * *